(12) United States Patent
Maeda (10) Patent No.: US 9,389,697 B2
(45) Date of Patent: Jul. 12, 2016

(54) IMAGE CAPTURING APPARATUS AND CONTROL METHOD

(71) Applicant: CANON KABUSHIKI KAISHA, Tokyo (JP)

(72) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/565,037

(22) Filed: Dec. 9, 2014

(65) Prior Publication Data

US 2015/0161761 A1    Jun. 11, 2015

(30) Foreign Application Priority Data

Dec. 11, 2013    (JP) ................................ 2013-256439

(51) Int. Cl.
| | |
|---|---|
| H04N 5/232 | (2006.01) |
| G06F 3/01 | (2006.01) |
| G03B 37/00 | (2006.01) |
| G02B 13/06 | (2006.01) |
| G02B 6/35 | (2006.01) |

(52) U.S. Cl.
CPC ............ *G06F 3/017* (2013.01); *H04N 5/23222* (2013.01); *H04N 5/23293* (2013.01)

(58) Field of Classification Search
CPC ............... G06F 3/017; H04N 5/23293; H04N 5/23222; G02B 6/3564; G02B 13/06; G03B 37/00
USPC ............... 348/333.02, 333.04, 208.99, 208.3, 348/208.11, 208.16; 396/529; 359/838
See application file for complete search history.

(56) References Cited

U.S. PATENT DOCUMENTS

| | | | | |
|---|---|---|---|---|
| 2003/0043261 | A1* | 3/2003 | Gianchandani | G01C 3/085 348/36 |
| 2004/0212699 | A1* | 10/2004 | Molgaard | G03B 17/00 348/231.99 |
| 2008/0204566 | A1* | 8/2008 | Yamazaki | G03B 5/00 348/208.99 |
| 2011/0310283 | A1* | 12/2011 | Shiozaki | H04N 5/23293 348/333.06 |
| 2013/0045001 | A1* | 2/2013 | Hara | G03B 13/06 396/378 |
| 2014/0085533 | A1* | 3/2014 | Celia | G03B 5/00 348/369 |

OTHER PUBLICATIONS

The Dual Axis electronic spirit level, EOS7D catalogue, Sep. 2009 p. 18.
http://www.egg-solution.nl/prod_photo.htm.

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image capturing apparatus on which a predetermined optical member is mountable, the apparatus comprises an image capturing unit which captures an object image incident on a lens unit, a detection unit which detects inclinations of the image capturing apparatus relative to a plurality of detection axes and a display control unit which performs control to display information indicating the inclinations of the image capturing apparatus on a display unit based on a detection result from the detection unit, wherein the display control unit performs control to display information indicating an inclination of the image capturing apparatus based on inclinations of different axes of the plurality of detection axes depending on a case in which the optical member is not mounted and a case in which the optical member is mounted.

14 Claims, 9 Drawing Sheets

IMAGE CAPTURING APPARATUS AND CONTROL METHOD

BACKGROUND OF THE INVENTION

1. Field of the Invention

The present invention relates to an image capturing apparatus having the function of an electronic spirit level.

2. Description of the Related Art

When deciding a camera composition in a scenery image capturing operation or the like, a spirit level is sometimes used to prevent the inclination of an image. This spirit level has a structure having an air bubble in a liquid, and is designed so that the inclination in the horizontal direction can be known based on the position of the air bubble. The spirit level is mounted on the accessory shoe of the camera when used. In addition, some recent digital cameras have an electronic spirit level function of detecting the attitude of the camera body based on an output from a three-dimensional acceleration sensor built in the camera body and displaying inclination amounts in the horizontal and vertical directions on a liquid crystal panel or viewfinder.

Figure 1A:
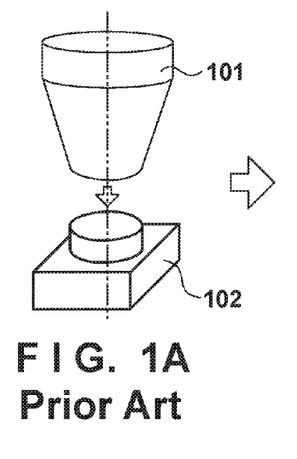
FIGS. 1A to 1D are views showing the arrangement of a digital camera on which an optical adapter according to an embodiment is mounted.
Figure 1B:
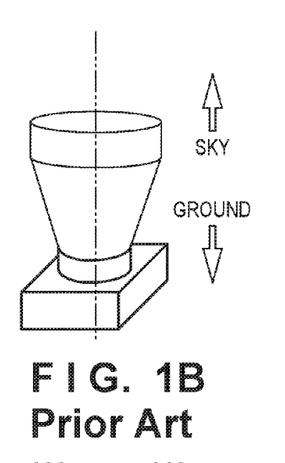
Figure 1C:
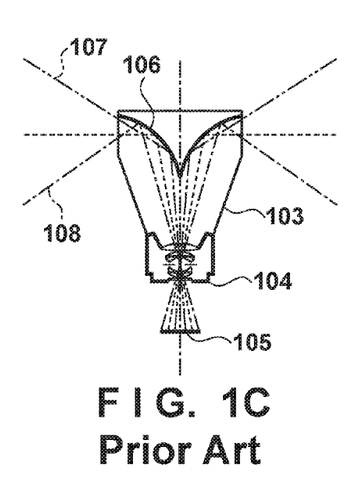
Figure 1D:
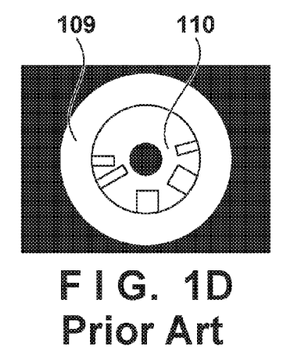
Figure 8A:
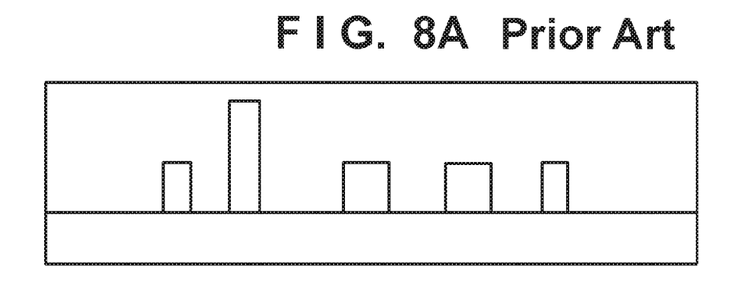
FIGS. 8A and 8B are views each exemplarily showing a panoramic image captured by using the omnidirectional capturing adapter.
Figure 8B:
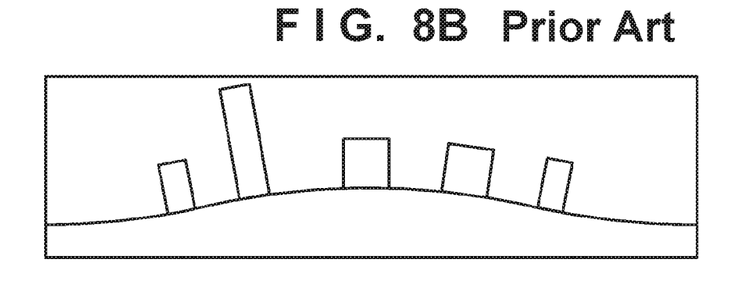

On the other hand, as shown in FIGS. 1A to 1D, there is commercially available an omnidirectional capturing adapter 101 which is mounted on the lens of a digital camera 102 to allow the camera to capture a panoramic image in 360° directions around the optical axis of the lens. As shown in FIG. 1D, the panoramic image captured by using the omnidirectional capturing adapter is an annular image. When, for example, capturing an image while holding the camera in the direction shown in FIG. 1B by using the omnidirectional capturing adapter, a portion 109 on the outer circumferential side corresponds to the ground direction, and a portion 110 on the inner circumferential side corresponds to the sky direction. Separately expanding this annular image by using image processing software can obtain a 360° panoramic image, as shown in FIGS. 8A and 8B.

SUMMARY OF THE INVENTION

In order to solve the aforementioned problems, the present invention provides an image capturing apparatus on which a predetermined optical member is mountable, the apparatus comprising: an image capturing unit configured to capture an object image incident on a lens unit; a detection unit configured to detect inclinations of the image capturing apparatus relative to a plurality of detection axes; and a display control unit configured to perform control to display information indicating the inclinations of the image capturing apparatus on a display unit based on a detection result from the detection unit, wherein the display control unit performs control to display information indicating an inclination of the image capturing apparatus based on inclinations of different axes of the plurality of detection axes depending on a case in which the optical member is not mounted and a case in which the optical member is mounted.

In order to solve the aforementioned problems, the present invention provides an image capturing apparatus comprising: an image capturing unit configured to capture an object image incident on a lens unit; a detection unit configured to detect inclinations of the image capturing apparatus relative to a plurality of detection axes; and a display control unit configured to perform control to display information indicating the inclinations of the image capturing apparatus on a display unit based on a detection result from the detection unit, wherein the display control unit is configured to switch between a first inclination display in which an inclination of the image capturing apparatus around an optical axis of the lens unit is displayed as an inclination of the image capturing apparatus and a second inclination display in which an inclination of the optical axis of the lens unit is displayed as an inclination of the image capturing apparatus.

In order to solve the aforementioned problems, the present invention provides a control method for a display apparatus for displaying an inclination of an image capturing apparatus on which a predetermined optical member is mountable and which includes a detection unit configured to detect inclinations relative to a plurality of detection axes, the method comprising: an acquisition step of acquiring inclination information of the image capturing apparatus which is detected by the detection unit; and a display control step of performing control to display information indicating the inclinations of the image capturing apparatus on a display apparatus based on the inclination information of the image capturing apparatus acquired in the acquisition step, wherein in the display control step, control is performed to display information indicating an inclination of the image capturing apparatus based on inclinations of different axes of the plurality of detection axes depending on a case in which the optical member is not mounted and a case in which the optical member is mounted.

Further features of the present invention will become apparent from the following description of exemplary embodiments (with reference to the attached drawings).

DESCRIPTION OF THE EMBODIMENTS

If the optical axis of a camera 102 is inclined in the vertical direction at the time of capturing a panoramic image by using an omnidirectional capturing adapter 101, the horizon or objects on it undulate in a panoramic image after expansion shown in FIG. 8B. For this reason, when capturing a panoramic image by using the omnidirectional capturing adapter 101, importance is placed on the operation of installing the camera so as to make the optical axis parallel to the vertical direction, that is, so-called vertical positioning. On the other hand, when performing capturing upon mounting the omnidirectional capturing adapter on the camera having the electronic spirit level function described above, since the camera is set to face upward, the user cannot see an inclination index in the horizontal direction originating from the electronic spirit level which is displayed on the liquid crystal panel. This makes it impossible to use the electronic spirit level as an aid to vertical positioning.

Figure 9A:
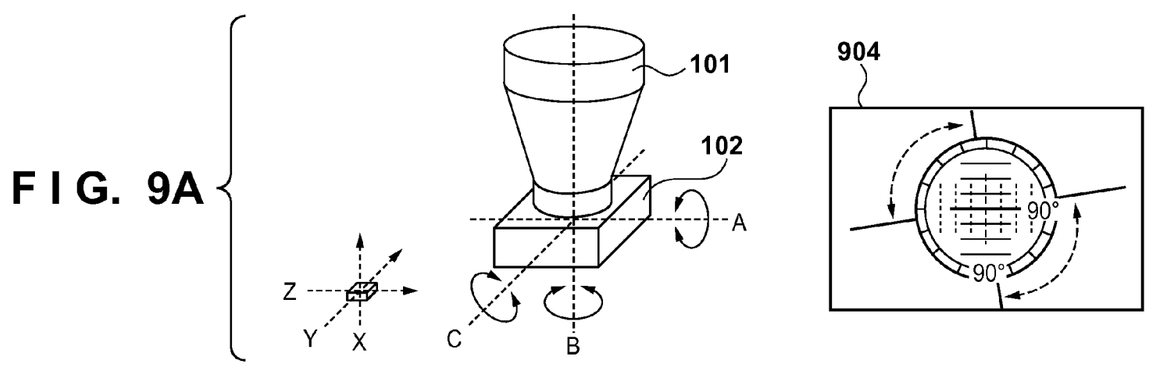
FIGS. 9A and 9B are views for explaining a problem in conventional electronic spirit level display.
Figure 9B:
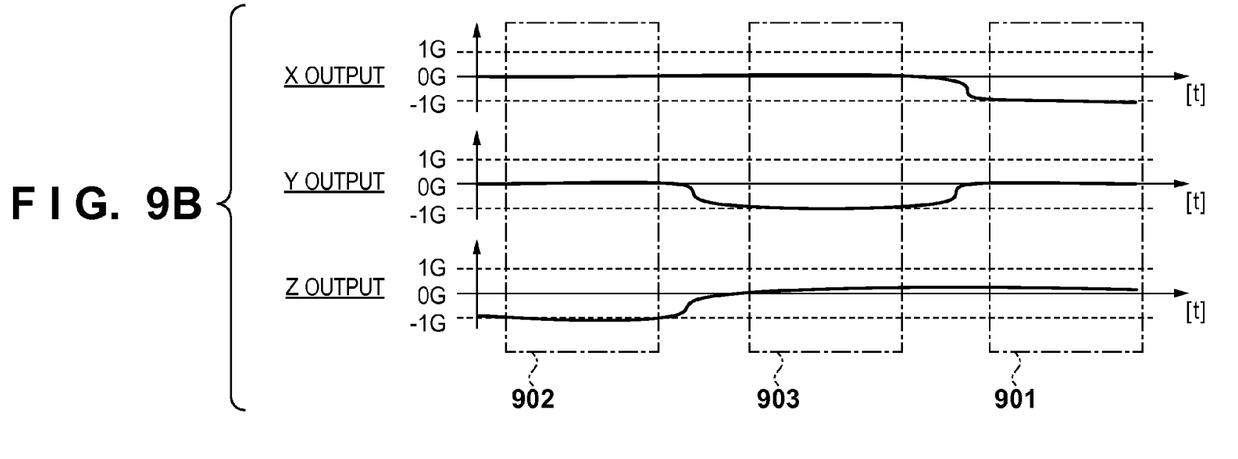

In addition, of FIGS. 9A and 9B, FIG. 9A shows the attitude of the camera with the omnidirectional capturing adapter being mounted on it and a display example of the electronic spirit level, and FIG. 9B shows transitions in output values from the three-dimensional acceleration sensor along the respective axes.

When performing vertical positioning while the omnidirectional capturing adapter shown in FIG. 9A is mounted, the Y output and Z output of an output 901 from the three-dimensional acceleration sensor fluctuate near 0 G. For this reason, the output 901 frequently changes to an output 902 (Z output>Y output) at the time of landscape position capturing or an output 903 (Z output<Y output) at the time of portrait position capturing due to the subtle movement of the camera body. In this case, a spirit level display 904 frequently switches between a landscape position capturing display and a portrait position capturing display, resulting in inability to use the inclination index. This present invention provides an image capturing apparatus which can optimally display an index concerning the attitude of the apparatus in accordance with a capturing state.

An embodiment for carrying out the present invention will be described in detail below. Note that each embodiment described below is an example for implementing the present invention, and should be modified or changed as needed depending on the arrangement and various conditions of an apparatus to which the present invention is applied. The present invention is not limited to the following embodiments. In addition, the present invention may be implemented by partly combining the respective embodiments, as needed.

Described below is an embodiment in which the image capturing apparatus according to the present invention is applied to a digital camera which captures moving images and still images.

<Function and Arrangement of Optical Member>

The function and arrangement of an optical member which can be mounted on the digital camera according to this embodiment will be described first with reference to FIGS. 1A to 1D.

FIGS. 1A to 1D respectively show a state in which the optical member is going to be mounted on the camera (FIG. 1A), a state in which the optical member is mounted on the camera (FIG. 1B), an internal optical path while the optical member is mounted on the camera (FIG. 1C), and the image captured by using the optical member (FIG. 1D).

Referring to FIGS. 1A to 1D, this embodiment includes the omnidirectional capturing adapter 101 as the optical member (to be also referred to as the optical adapter hereinafter), the digital camera 102, a sectional structure 103 inside the omnidirectional capturing adapter, a sectional structure 104 of the lens unit of the camera, and an image capturing surface 105 of an image sensor in the camera. An omnidirectional capturing mirror 106 is a main component of the omnidirectional capturing adapter 101. The omnidirectional capturing mirror 106 can condense light beams in the range of about 45° in the vertical direction and 360° in the horizontal direction, centered on a 90° direction relative to the optical axis of the lens unit 104, and sends the condensed light beam to the lens unit 104. A light beam 107 from above (sky direction) is formed into an image near the center of the image capturing surface 105 of the image sensor. A light beam 108 from below (the ground direction) is formed near the periphery of the image capturing surface 105 of the image sensor.

FIG. 1D exemplarily shows the panoramic image captured by using the omnidirectional capturing adapter 101. An object around the optical axis of the camera is formed into an annular image, and is captured such that an area 109 on the outer circumferential side corresponds to the lower side (ground direction), and an area 110 on the inner circumferential side corresponds to the upper side (sky direction).

<Apparatus Arrangement>

The function and arrangement of the digital camera according to this embodiment will be described next with reference to FIG. 2.

Figure 2:
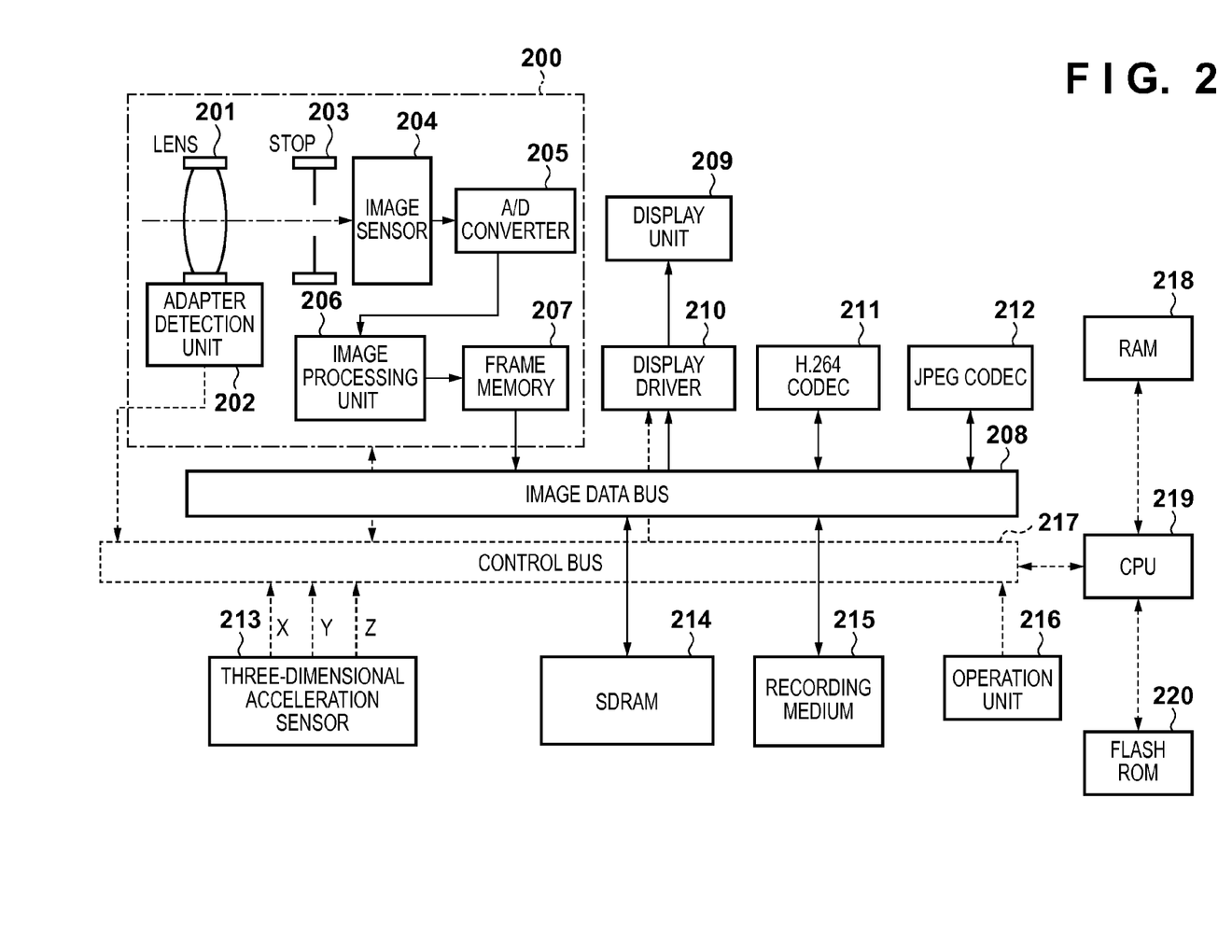
FIG. 2 is a block diagram showing the arrangement of the digital camera according to this embodiment.

Referring to FIG. 2, an image capturing unit 200 includes a capturing lens 201, an adapter detection unit 202, a stop 203, an image sensor 204, an A/D converter 205, an image processing unit 206, and a frame memory 207.

The capturing lens 201 captures an object image and forms it on the image capturing surface of the image sensor 204. The adapter detection unit 202 includes a switch for mechanically detecting whether the optical member is mounted. The stop 203 limits the light amount of an object image incident from the capturing lens 201 to a predetermined amount. Photoelectric conversion elements constituting a CMOS image sensor or the like convert the object image formed on the image sensor 204 into an electrical signal. The A/D converter 205 converts the electrical signal into a digital signal and outputs it to the image processing unit 206. The image processing unit 206 performs gamma correction, white balance correction, noise reduction processing, and the like for an input image signal. The frame memory 207 accumulates uncompressed image data from the image processing unit 206 frame by frame, and outputs the data to an image data bus 208.

A three-dimensional acceleration sensor 213 detects gravitational accelerations in the orthogonal X, Y, and Z directions, and outputs the respective accelerations in the X, Y, and Z directions which are detected in accordance with the attitude of the camera body to a CPU 219 via a control bus 217. Note that one of the X, Y, and Z directions coincides with or becomes parallel to the optical axis of the camera. A display unit (to be referred to as a display panel hereinafter) 209 is a thin display device such as a liquid crystal panel or organic EL panel, and displays moving images, still images, an electronic spirit level display (to be described later), and other various types of information concerning capturing.

An H.264 codec 211 generates AVCHD moving image stream data by compression-coding uncompressed image data transferred from the image capturing unit 200 via the image data bus 208 as a moving image. A JPEG codec 212 generates JPEG still image data by compression-coding uncompressed image data transferred from the image capturing unit 200 via the image data bus 208 as a still image.

An SDRAM 214 writes in and reads from, a recording medium 215, the AVCHD moving image stream data generated by the H.264 codec 211 and the JPEG still image data generated by the JPEG codec 212, and provides a buffer memory space for arbitration with the recording speed of the recording medium 215. In addition, the SDRAM 214 also functions as an image display memory (video memory).

A display driver 210 converts the image display data stored in the SDRAM 214 into a display signal and supplies it to the display panel 209. In this manner, the display panel 209 displays the display image data written in the SDRAM 214 via the display driver 210. The display panel 209 performs display in accordance with a display signal from the display driver 210. The display driver 210 converts the digital signals obtained by A/D conversion by the A/D converter 205 and accumulated in the SDRAM 214 into display signals and sequentially transfers the signals to the display panel 209. With this operation, the display panel 209 functions as an electronic viewfinder which can display a live view image.

The recording medium 215 is a memory card formed from, for example, a NAND flash memory, which is detachably mounted in the camera body. AVCHD moving image stream data and JPEG still image data are generated in conformity with a PC-compatible FAT (File Allocation Table) file system recognized as a disk drive when it is connected to the PC, and are recorded in the recording medium 215.

An operation unit 216 includes various types of switches which accept various types of operations from the operator, a shutter button with which the operator performs a still image capturing operation, and a trigger switch with which the operator starts/stops a moving image recording operation.

The control bus 217 is a signal path through which control signals are communicated between the respective blocks. The control bus 217 transfers control signals from the CPU 219 to the respective blocks, and transfers response signals from the respective blocks and detection signals from the respective sensors to the CPU 219. A flash ROM 220 is a nonvolatile memory capable of electrically erasing and recording data, and stores constants, programs, and the like for the operation of the CPU 219. In this case, the programs are those for executing the flowcharts described later in this embodiment. The CPU 219 controls the camera body. Executing the programs stored in the flash ROM 220 (to be described later) will implement the respective types of processing (to be described later) in this embodiment. A RAM is used as a system memory 218. Constants, variables, programs read out from the flash ROM 220, and the like for the operation of the CPU 219 are loaded in the RAM 218. In addition, the CPU 219 performs display control by controlling the display driver 210 and the like.

<Capturing Attitude of Camera and Display Form of Electronic Spirit Level>

The attitude of the digital camera according to this embodiment at the time of capturing and the display form of the electronic spirit level will be described with reference to FIGS. 3A to 3C and 4A to 4C.

Figure 3A:
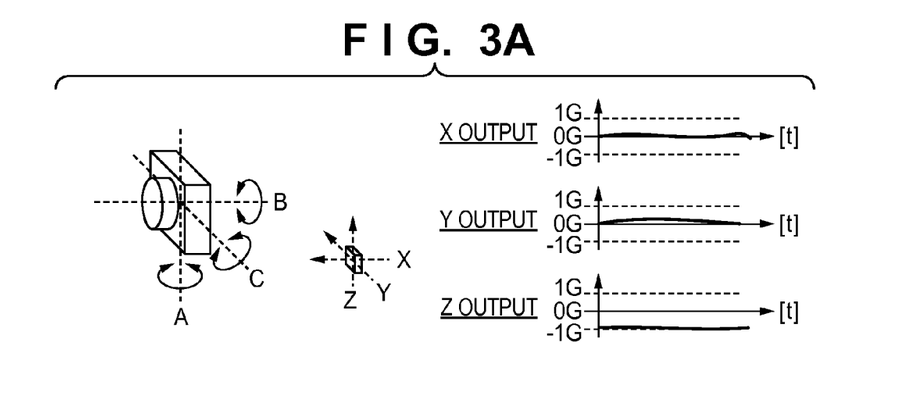
FIGS. 3A to 3C are views for explaining the attitude of the digital camera according to this embodiment at the time of capturing.

As shown in FIG. 3A, when performing landscape position capturing without mounting the omnidirectional capturing adapter on the camera, outputs from the three-dimensional acceleration sensor 213 transition to near 0 G in the X direction, near 0 G in the Y direction, and −1 G in the Z direction.

Figure 3B:
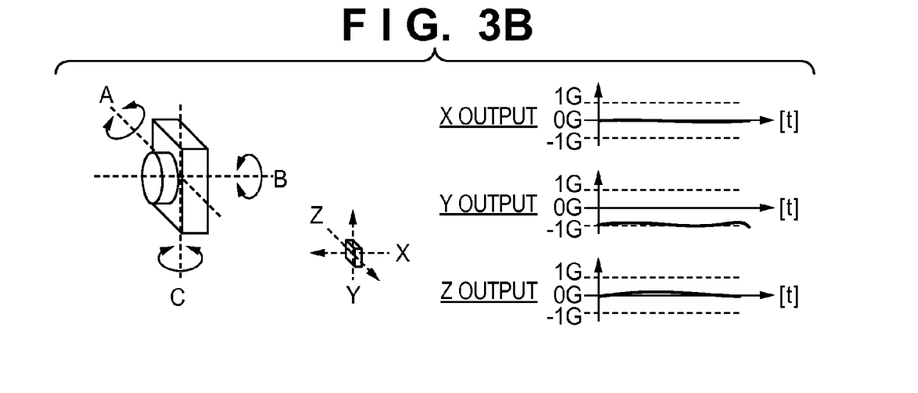

In addition, as shown in FIG. 3B, when performing portrait position capturing without mounting the omnidirectional capturing adapter on the camera, outputs from the three-dimensional acceleration sensor 213 transition to near 0 G in the X direction, near −1 G in the Y direction, and 0 G in the Z direction.

Figure 3C:
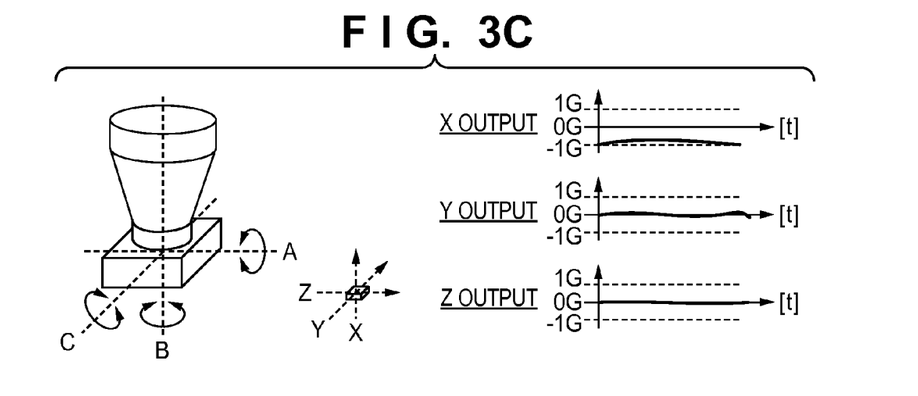

Furthermore, as shown in FIG. 3C, performing 360° panoramic capturing while the omnidirectional capturing adapter is mounted on the camera, outputs from the three-dimensional acceleration sensor 213 transition to near −1 G in the X direction, near 0 G in the Y direction, and 0 G in the Z direction.

Figure 4A:
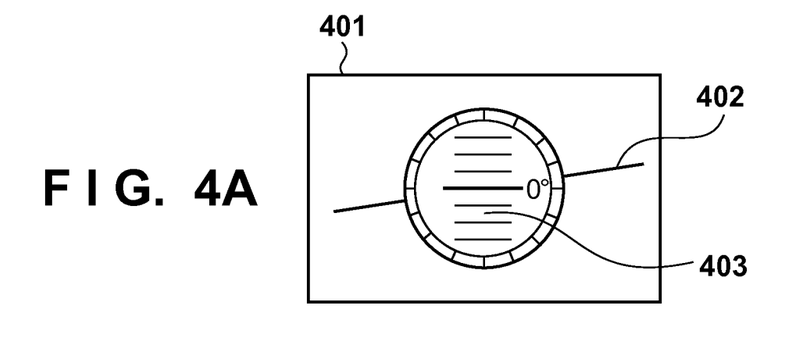
FIGS. 4A to 4C are views each exemplarily showing a display form of the electronic spirit level of the digital camera according to this embodiment.

FIG. 4A shows the display form of the electronic spirit level when performing landscape position capturing without mounting the omnidirectional capturing adapter on the camera. FIG. 4A shows a display screen 401, a horizontal inclination index 402 indicating the degree of inclination in the horizontal direction, and an elevation angle index 403 indicating the degree of inclination in the vertical direction.

Figure 4B:
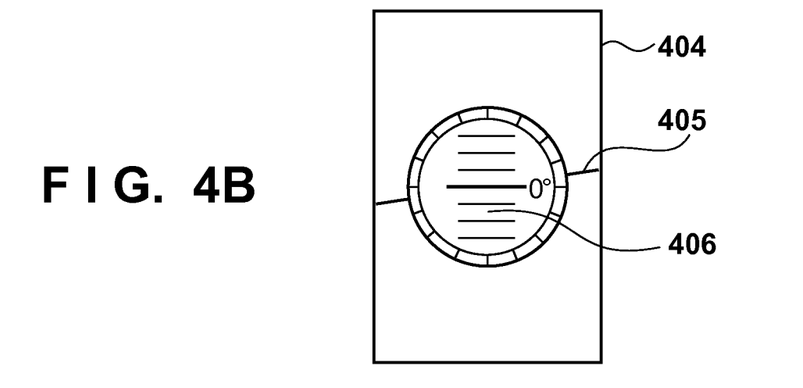

FIG. 4B shows the display form of the electronic spirit level when performing portrait position capturing without mounting the omnidirectional capturing adapter on the camera. FIG. 4B shows a display screen 404, a horizontal inclination index 405 indicating the degree of inclination in the horizontal direction, and an elevation angle index 406 indicating the degree of inclination in the vertical direction. That is, the display forms of the electronic spirit level in FIGS. 4A and 4B each are designed to display an inclination in the horizontal direction, that is, the inclination of the camera around the optical axis, and an elevation angle, that is, the inclination of the camera in the vertical direction of the optical axis. While the omnidirectional capturing adapter is not mounted on the camera, the horizontal direction of the camera is important, and hence only an inclination in the horizontal direction, that is, the inclination of the camera around the optical axis, may be displayed.

Figure 4C:
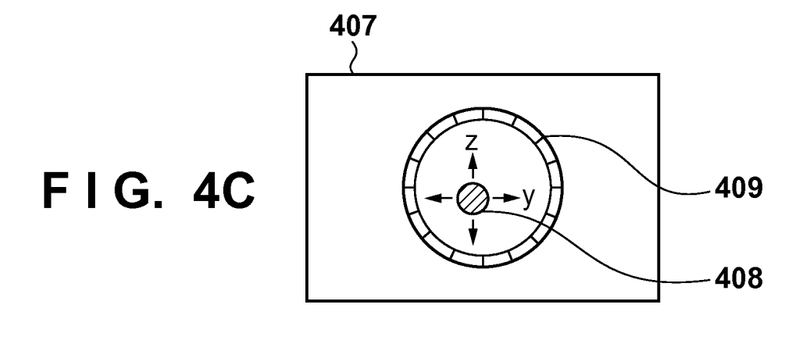

In addition, FIG. 4C shows the display form of the electronic spirit level when performing 360° panoramic capturing while the omnidirectional capturing adapter is mounted on the camera. FIG. 4C shows a display screen 407, a vertical inclination index 408 indicating the degree of inclination in the optical axis direction of the camera relative to the vertical direction, and a reference 409 for the position of a vertical inclination index. When the index 408 is positioned in the center of the circle, it indicates that the vertical direction coincides with the optical axis of the camera. That is, the display form of the electronic spirit level in FIG. 4C displays the inclination of the optical axis.

<Description of Operation>

The operation of the digital camera according to this embodiment in the camera mode will be described next with reference to FIGS. 5A and 5B.

Figure 5A:
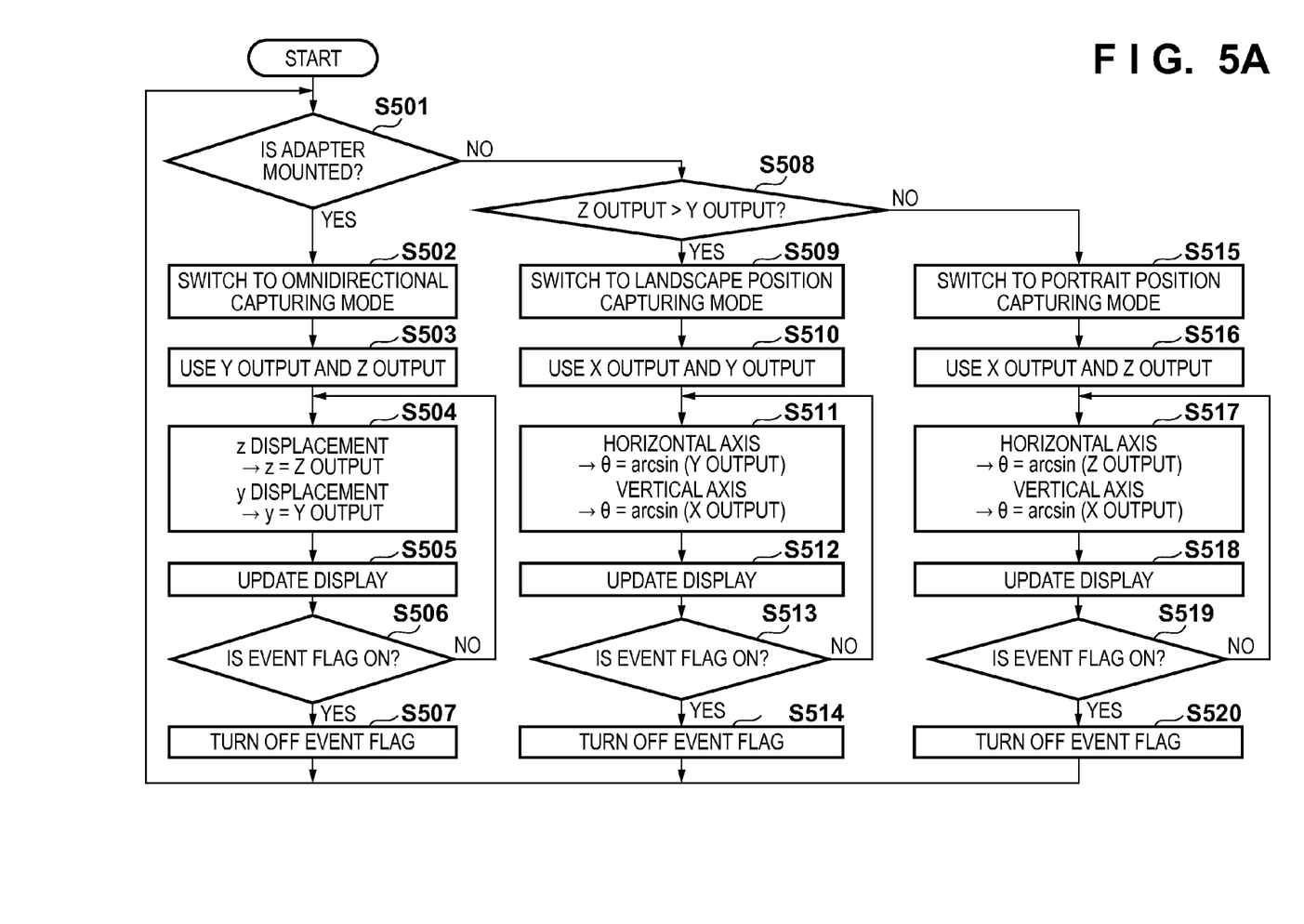
FIGS. 5A and 5B are flowcharts showing the operation of the digital camera according to this embodiment in a camera mode.
Figure 5B:
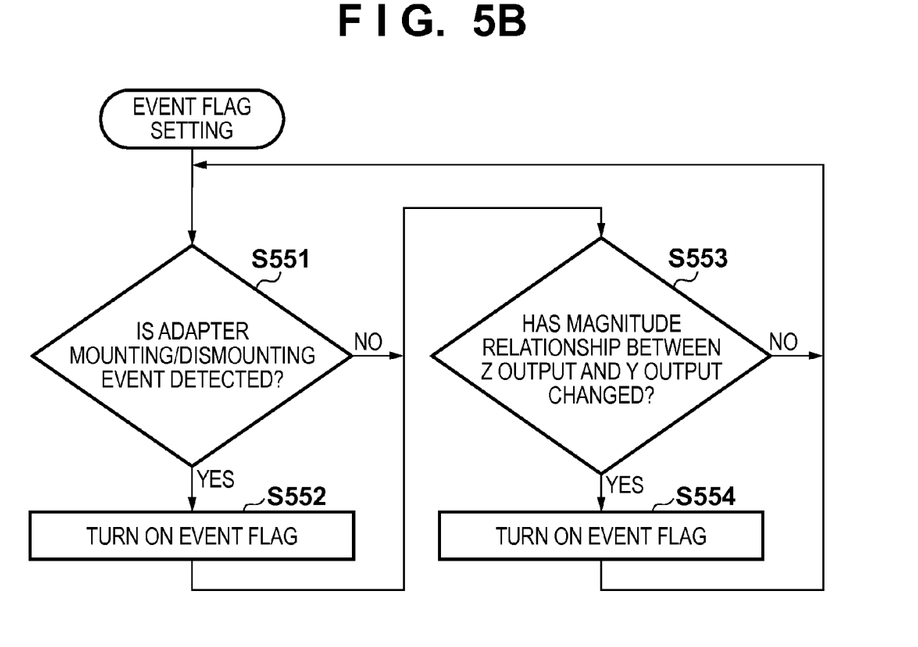

FIGS. 5A and 5B show the operation of the digital camera according to this embodiment in the camera mode. FIG. 5A shows the operation of a main task. FIG. 5B shows the operation of an event detection task for switching the display forms of the electronic spirit level.

Note that the processing in FIGS. 5A and 5B starts when the power supply is turned on in the camera mode in which the digital camera captures an image. The CPU 219 implements the processing by loading, in the work area of the RAM 218, the program stored in the ROM 220 and executing it.

Referring to FIG. 5A, in step S501, the CPU 219 determines, upon receiving a detection result from the adapter detection unit 202, whether the omnidirectional capturing adapter 101 is mounted on the lens unit 104. If YES in step S501, the process advances to step S502. If NO in step S501, the process advances to step S508.

In step S502, the CPU 219 switches the display form of the electronic spirit level displayed on the display panel 209 to the display form for omnidirectional capturing shown in FIG. 4C.

In step S503, the CPU 219 switches the output of the three-dimensional acceleration sensor 213, which is used to calculate the display position of the vertical inclination index 408, to the Y direction and the Z direction.

In step S504, the CPU 219 calculates coordinates for displaying the vertical inclination index 408 such that the positions of z- and y-direction components of the vertical inclination index 408 respectively cooperate with the Z and Y outputs. Note that when both the Z and Y outputs are 0 G, the vertical inclination index 408 is displayed in the center of the index frame 409. This enables the operator to discriminate that the vertical direction is perfectly parallel to the optical axis of the camera.

Upon completion of the calculation of coordinates, the CPU 219 updates the display of the electronic spirit level in step S505. In step S504, the calculation result is reflected in the display position of the vertical inclination index 408.

The processing in steps S504 and S505 is repeated until the event flag is turned on in step S506. The output results obtained by the three-dimensional acceleration sensor 213 are sequentially reflected in the display position of the vertical inclination index.

In step S506, the CPU 219 determines whether the event flag (to be described later) is ON. If YES in step S506, the process advances to step S507. If NO in step S506, the process returns to step S504.

In step S507, the CPU 219 turns off the event flag. The process then returns to step S501.

If it is determined in step S501 that the omnidirectional capturing adapter is not mounted, the process advances to step S508, in which the CPU 219 compares the absolute values of the Y and Z outputs of the three-dimensional acceleration sensor 213. If the comparison result indicates that the Z output is larger, landscape position capturing is determined. The process then advances to step S509. If the Y output is larger, portrait position capturing is determined. The process then advances to step S515.

In step S509, the CPU 219 switches the display form of the electronic spirit level displayed on the display panel 209 to the display form for landscape position capturing shown in FIG. 4A.

In step S510, the CPU 219 switches the output of the three-dimensional acceleration sensor 213, which is used to calculate the display angle of the horizontal inclination index 402 and the display position of the elevation angle index 403, to the X direction and the Y direction.

In step S511, the CPU 219 calculates an angle θy defined by the horizontal inclination index 402 and a screen long side as θy=arcsin (Y output), and an angle θx displayed by the elevation angle index 403 as θx=arcsin (X output). Note that when the Y output is 0 G, the horizontal inclination index 402 is parallel to a screen long side. If the X output is 0 G, the angle displayed by the elevation angle index 403 is an angle of 0°.

When the calculation is complete, the CPU 219 updates the display of the electronic spirit level in step S512. The calculation result in step S511 is reflected in the display of the horizontal inclination index 402 and the elevation angle index 403.

The processing in steps S511 and S512 is repeated until the event flag is turned on in step S513. The output results obtained by the three-dimensional acceleration sensor 213 are sequentially reflected in the display of the horizontal inclination index 402 and the elevation angle index 403.

In step S514, the CPU 219 turns off the event flag. The process then returns to step S501.

If it is determined in step S508 that the Y output is larger, the process advances to step S515, in which the CPU 219 switches the display form of the electronic spirit level displayed on the display panel 209 to the display form for portrait position capturing shown in FIG. 4B.

In step S516, the CPU 219 switches the output of the three-dimensional acceleration sensor 213, which is used to calculate the display angle of the horizontal inclination index 405 and the display position of the elevation angle index 406, to the X direction and the Z direction.

In step S517, the CPU 219 calculates an angle θz defined by the horizontal inclination index 405 and a screen short side as θz=zrcsin (Z output) and an angle θx displayed by the elevation angle index 406 as θ=arcsin (X output). Note that if the Z output is 0 G, the horizontal inclination index 405 is parallel to the screen short side, whereas if the X output is 0 G, the angle displayed by the elevation angle index 406 is 0°.

Upon completing the calculation, the CPU 219 updates the display of the electronic spirit level in step S518. The calculation result in step S517 is reflected in the display of the horizontal inclination index 405 and the elevation angle index 406.

The processing in steps S517 and S518 is repeated until the event flag is turned on in step S519. The output results obtained by the three-dimensional acceleration sensor 213 are sequentially reflected in the display of the horizontal inclination index 405 and the elevation angle index 406. In step S520, the CPU 219 turns off the event flag. The process then returns to step S501.

FIG. 5B shows the above event detection processing. In step S551, the CPU 219 determines, upon receiving the detection result obtained by the adapter detection unit 202, a state change as a result of mounting or dismounting the omnidirectional capturing adapter. If the determination result indicates that a state change is detected, the process advances to step S552. If no state change is detected, the process advances to step S553.

In step S552, the CPU 219 turns on the event flag.

In step S553, the CPU 219 determines whether the magnitude relationship between the absolute values of the Y and Z outputs of the three-dimensional acceleration sensor 213 changes. If the determination result indicates the detection of a change, the process advances to step S554. If no change is detected, the process returns to step S551.

In step S554, the CPU 219 turns on the event flag, and the process returns to step S551.

As described above, when performing a capturing operation by using the digital camera according to this embodiment without mounting the optical adapter such as the omnidirectional capturing adapter, it is detected, based on the attitude of the camera, whether landscape position capturing or portrait position capturing is performed. The camera then performs electronic spirit level display suitable for each operation. When performing 360° panoramic capturing upon mounting the omnidirectional capturing adapter on the camera, the current display switches to the display of the electronic spirit level which facilitates checking whether the vertical direction is parallel to the optical axis of the camera. It is therefore possible to always provide an optimal electronic spirit level without making the operator aware whether the omnidirectional capturing adapter is mounted. The operator can capture a panoramic image like that shown in FIG. 8A without any distortion of the horizon caused by the inclination of the optical axis direction of the camera.

Figure 6A:
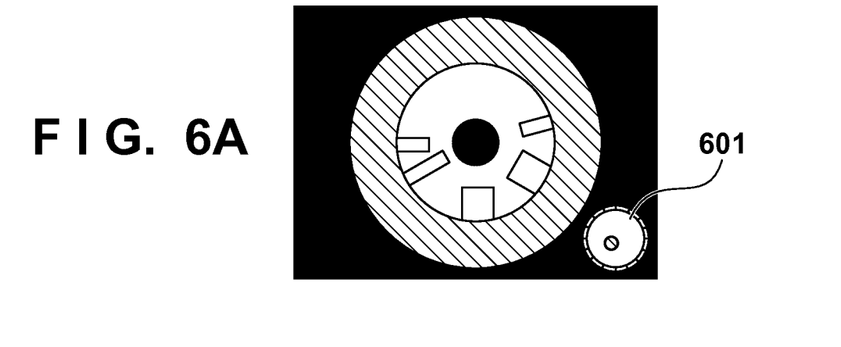
FIGS. 6A to 6C are views exemplarily showing other display forms of the electronic spirit level according to this embodiment.

Note that while the omnidirectional capturing adapter is mounted, since a captured image is formed into an annular image as shown in FIG. 1D, a portion as a black image in which no image is displayed always exists outside this annular image. It is therefore possible to arrange an electronic spirit level 601 for omnidirectional capturing in the black image portion, as shown in FIG. 6A.

Figure 6B:
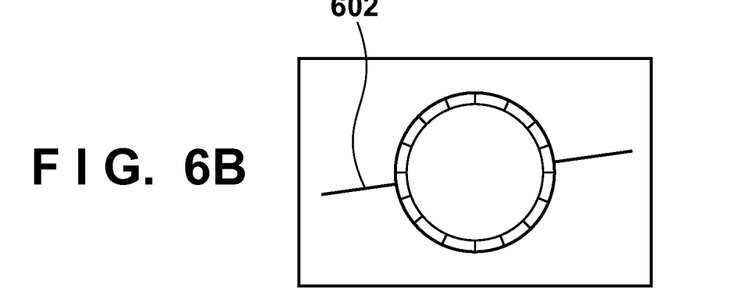

This embodiment has exemplified the omnidirectional capturing adapter as an optical member. However, the present invention is not limited to this. For example, when performing near-distance capturing by using a macro lens, the operator often need not consider the up and down angles of the camera and may consider only the horizontal inclination of the camera. When the macro lens is mounted, therefore, only a horizontal inclination index 602, that is, the inclination of the camera around the optical axis, may be displayed by using only the Y output of the three-dimensional acceleration sensor 213, with the angle θy defined by the horizontal inclination index 602 and the screen long side being given by θy=arcsin (Y output) as shown in FIG. 6B.

Figure 6C:
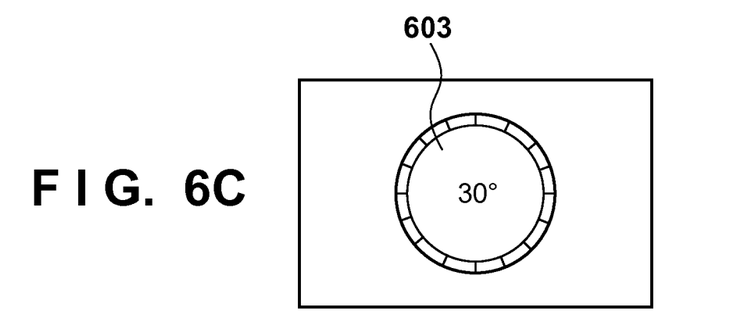

In addition, for example, when performing astronomical capturing upon connecting an astronomical telescope to the camera, although the operator need not consider the horizontal inclination of the camera, discriminating the angle of the camera in the vertical direction will help to search for an astronomical object. When, therefore, the astronomical telescope is mounted on the camera, an elevation angle, that is, the vertical inclination of the optical axis, may be displayed on a numerical value display 603 by using only the X output of the three-dimensional acceleration sensor 213, with the angle θx being given by θ=arcsin (X output), as shown in FIG. 6C.

Furthermore, in this embodiment, although the adapter detection unit 202 is configured to detect only the presence/absence of the optical adapter, the adapter detection unit 202 may be configured to identify the type of adapter, for example, the omnidirectional capturing adapter, macro lens, or astronomical telescope to enable one camera to switch to an electronic spirit level display corresponding to each capturing state described above. This makes it possible to perform electronic spirit level display optimal for an optical adapter complying with various capturing purposes.

Figure 7:
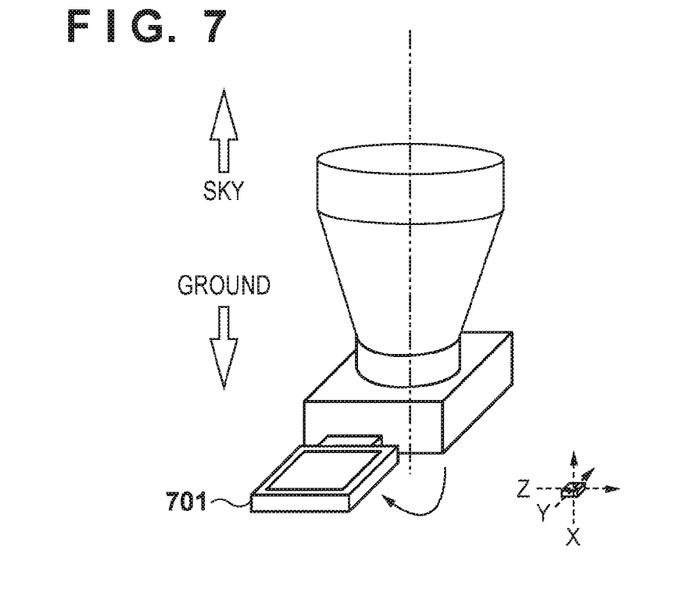
FIG. 7 is a perspective view exemplarily showing another display form of the electronic spirit level according to this embodiment.

In addition, the display panel of the digital camera according to this embodiment is fixed to the back surface of the camera body, and hence the operator needs to look into the display panel from below when performing panoramic capturing using the omnidirectional capturing adapter. However, as shown in FIG. 7, the angle of the display surface of a display panel 701 may be made variable with respect to the camera body to as to allow the operator to visually recognize the display panel 701 from above by making the display panel 701 face upward. In this case, as shown in FIG. 7, when the orientation of the display panel 701 is inverted, the position of a y-direction component may be switched to synchronize with the Y output in an inverse direction so as to allow the operator to intuitively grasp an inclination in the vertical direction regardless of the orientation of the display panel 701.

In addition, this embodiment is configured to mount the optical adapter on the digital camera having a general capturing lens. However, the present invention is not limited to this, and can be applied to a digital camera which does not have a lens by itself and is of a lens interchangeable type. In this case, the adapter detection unit 202 can be configured to be capable of detecting the type of interchangeable lens. With this arrangement, when, for example, a fish-eye lens is mounted, the display form of the electronic spirit level may be switched to the form shown in FIG. 4C, and the output of the three-dimensional acceleration sensor 213 used for the calculation of the display position of the vertical inclination index 408 may be switched to the Y direction and the Z direction. In this case, in a case in which the camera is directed toward the zenith to capture a sky so as to measure the amount of cloud, as is often the case of capturing using a fish-eye lens, it is easy to accurately align the zenith with the center of the screen, thereby more accurately measuring the amount of cloud.

In addition, assume that the type of interchangeable lens is a shift lens. In this case, when, for example, obliquely capturing a stage, a horizontal shift is used to correct a phenomenon in which the stage appears in different sizes in the horizontal direction. Therefore, when importance is placed on such horizontal leveling, the display form of the electronic spirit level can be configured to provide only a display in the horizontal inclination direction. In addition, a vertical shift (tilt) is used to correct a phenomenon in which a captured building or the like appears tapered upward. In such a case, since discriminating the vertical direction will facilitate setting a shift amount, the display form of the electronic spirit level can be configured to provide only a display in the vertical direction.

In addition, the above embodiment has exemplified the case in which the present invention is implemented by the digital camera. However, the present invention is not limited to the digital camera and may be implemented by other types of apparatuses. For example, the present invention may be implemented by a system formed by connecting a plurality of apparatuses, that is, a digital camera, an external display apparatus, and a control apparatus. In this case, the control apparatus may acquire captured image data from the digital camera and information concerning the attitude of the digital camera and information indicating whether an optical adapter is mounted, and control display with respect to the external display apparatus by using the acquired information. In this case, any apparatus of the digital camera, the external display apparatus, and the control apparatus may perform control on the overall system and display control on the external display apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-256439, filed Dec. 11, 2013, which is hereby incorporated by reference herein in its entirety.

What is claimed is:

1. An image capturing apparatus on which a predetermined optical member is mountable, the apparatus comprising:

an image capturing unit configured to capture an object image incident on a lens unit;

a detection unit configured to detect inclinations of the image capturing apparatus relative to a plurality of detection axes; and a display control unit configured to perform control to display information indicating the inclinations of the image capturing apparatus on a display unit based on a detection result from the detection unit, wherein the display control unit performs control to display information indicating an inclination of the image capturing apparatus based on inclinations of different axes of the plurality of detection axes depending on a case in which the optical member is not mounted and a case in which the optical member is mounted and performs control to display an inclination around an optical axis of the lens unit as an inclination of the image capturing apparatus when the optical member is not mounted, and display an inclination of the optical axis of the lens unit as an inclination of the image capturing apparatus when the optical member is mounted.

2. The apparatus according to claim 1, wherein the display control unit performs control to display, on the display unit, information indicating an inclination of the image capturing apparatus based on an inclination of the image capturing apparatus, detected by the detection unit, relative to one of an axis parallel to the optical axis of the lens unit and two axes perpendicular to the optical axis of the lens unit, when the predetermined optical member is not mounted, and to display, on the display unit, information indicating inclinations of the image capturing apparatus based on inclinations of the image capturing apparatus relative to the two axes perpendicular to the optical axis of the lens unit.

3. The apparatus according to claim 1, further comprising an optical member detection unit configured to detect mounting of the predetermined optical member, wherein the display control unit switches whether information indicating an inclination of the image capturing apparatus is displayed based on a specific one of the plurality of detection axes, in accordance with a detection result from the optical member detection unit.

4. The apparatus according to claim 3, wherein the optical member detection unit identifies a type of the predetermined optical member.

5. The apparatus according to claim 4, wherein when the optical member detection unit detects mounting of a macro lens, the display control unit performs control to display a horizontal inclination of the image capturing apparatus as information indicating an inclination of the image capturing apparatus.

6. The apparatus according to claim 4, wherein when the optical member detection unit detects mounting of a fish-eye lens, the display control unit performs control to display an inclination of the optical axis as information indicating an inclination of the image capturing apparatus.

7. The apparatus according to claim 1, wherein the predetermined optical member comprises an omnidirectional capturing adapter configured to form an image of an object around the optical axis of the lens unit on the image capturing unit.

8. The apparatus according to claim 7, wherein the display control unit displays information concerning an inclination of the image capturing apparatus at a position at which the information does not overlap an annular image captured by the image capturing unit, when the omnidirectional capturing adapter is mounted.

9. The apparatus according to claim 1, further comprising a lens unit, wherein the image capturing unit captures an object image incident on the lens unit, and the optical member is mountable on the lens unit.

10. The apparatus according to claim 1, wherein an optical member including a lens unit is mountable on the image capturing unit.

11. An image capturing apparatus comprising:

an image capturing unit configured to capture an object image incident on a lens unit;

a detection unit configured to detect inclinations of the image capturing apparatus relative to a plurality of detection axes; and a display control unit configured to perform control to display information indicating the inclinations of the image capturing apparatus on a display unit based on a detection result from the detection unit, wherein the display control unit is configured to switch between a first inclination display in which an inclination of the image capturing apparatus around an optical axis of the lens unit is displayed as an inclination of the image capturing apparatus and a second inclination display in which an inclination of the optical axis of the lens unit is displayed as an inclination of the image capturing apparatus.

12. The apparatus according to claim 11, wherein a predetermined optical member is mountable on the image capturing apparatus, and the display control unit switches between the first display inclination display and the second inclination display in accordance with mounting of the predetermined optical member.

13. A control method for a display apparatus for displaying an inclination of an image capturing apparatus on which a predetermined optical member is mountable and which includes a detection unit configured to detect inclinations relative to a plurality of detection axes, the method comprising:

an acquisition step of acquiring inclination information of the image capturing apparatus which is detected by the detection unit; and a display control step of performing control to display information indicating the inclinations of the image capturing apparatus on a display apparatus based on the inclination information of the image capturing apparatus acquired in the acquisition step, wherein in the display control step, control is performed to display information indicating an inclination of the image capturing apparatus based on inclinations of different axes of the plurality of detection axes depending on a case in which the optical member is not mounted and a case in which the optical member is mounted and is performed to display an inclination around an optical axis of the lens unit as an inclination of the image capturing apparatus when the optical member is not mounted, and display an inclination of the optical axis of the lens unit as an inclination of the image capturing apparatus when the optical member is mounted.

14. A non-transitory computer-readable storage medium storing a program for causing a computer to execute the control method for a display apparatus for displaying an inclination of an image capturing apparatus on which a predetermined optical member is mountable and which includes a detection unit configured to detect inclinations relative to a plurality of detection axes, the method comprising:

an acquisition step of acquiring inclination information of the image capturing apparatus which is detected by the detection unit and a display control step of performing control to display information indicating the inclinations of the image capturing apparatus on a display apparatus based on the inclination information of the image capturing apparatus acquired in the acquisition step, wherein in the display control step, control is performed to display information indicating an inclination of the image capturing apparatus based on inclinations of different axes of the plurality of detection axes depending on a case in which the optical member is not mounted and a case in which the optical member is mounted and is performed to display an inclination around an optical axis of the lens unit as an inclination of the image capturing apparatus when the optical member is not mounted, and display an inclination of the optical axis of the lens unit as an inclination of the image capturing apparatus when the optical member is mounted.

* * * * *